US009525766B2

(12) United States Patent
Niu

(10) Patent No.: US 9,525,766 B2
(45) Date of Patent: Dec. 20, 2016

(54) METHOD, DEVICE AND SYSTEM FOR AUTOMATICALLY SWITCHING VOICE CALL SERVICES

(71) Applicant: ZTE Corporation, Shenzhen, Guangdong (CN)

(72) Inventor: Haimin Niu, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 27 days.

(21) Appl. No.: 14/434,181

(22) PCT Filed: Aug. 16, 2013

(86) PCT No.: PCT/CN2013/081692
§ 371 (c)(1),
(2) Date: Apr. 8, 2015

(87) PCT Pub. No.: WO2014/056353
PCT Pub. Date: Apr. 17, 2014

(65) Prior Publication Data
US 2015/0319277 A1 Nov. 5, 2015

(30) Foreign Application Priority Data
Oct. 9, 2012 (CN) .......................... 2012 1 0379439

(51) Int. Cl.
H04M 1/253 (2006.01)
H04L 29/12 (2006.01)
(Continued)

(52) U.S. Cl.
CPC ........ H04M 1/2535 (2013.01); H04L 61/2007 (2013.01); H04W 36/0011 (2013.01);
(Continued)

(58) Field of Classification Search
CPC .................................................. H04M 1/2535
(Continued)

(56) References Cited

U.S. PATENT DOCUMENTS 5,913,160 A * 6/1999 Leung ............... G06F 17/30575
379/230
6,795,444 B1 * 9/2004 Vo ..................... H04L 29/06027
370/401
(Continued)

FOREIGN PATENT DOCUMENTS

CN 1391396 A 1/2003
CN 1968328 A 5/2007
(Continued)

OTHER PUBLICATIONS

International Search Report in international application No. PCT/CN2013/081692, mailed on Nov. 21, 2013.
(Continued)

Primary Examiner — Andrew Lai
Assistant Examiner — Andrew C Lee
(74) Attorney, Agent, or Firm — Oppedahl Patent Law Firm LLC

(57) ABSTRACT

A method, device and system for automatically switching voice call services are described which are capable of intelligently determining IP network service authority states and data connection states of a current calling party and a called party through the cooperation of a terminal and an IP network service server when a user initiates a voice call based on a PLMN network and automatically switching the voice call of the PLMN network to a voice call service of an IP network when the states of the calling party and the called party both meet a set switching condition. By bearing the current call with the IP network instead of the PLMN network, the method, the device and the system disclosed
(Continued)

herein achieve the purposes of improving call quality and saving call fee.

17 Claims, 2 Drawing Sheets

(51) Int. Cl.
*H04W 76/02* (2009.01)
*H04W 36/00* (2009.01)
*H04W 84/04* (2009.01)
*H04W 88/02* (2009.01)
*H04W 84/12* (2009.01)
*H04W 36/14* (2009.01)

(52) U.S. Cl.
CPC ............ *H04W 76/02* (2013.01); *H04W 36/14* (2013.01); *H04W 84/042* (2013.01); *H04W 84/12* (2013.01); *H04W 88/02* (2013.01)

(58) Field of Classification Search
USPC ................ 370/331, 241, 354, 338, 401, 356
See application file for complete search history.

(56) References Cited

U.S. PATENT DOCUMENTS

| | | | | |
|---|---|---|---|---|
| 7,885,187 | B2* | 2/2011 | Chun | H04L 65/80 370/231 |
| 8,478,277 | B2* | 7/2013 | Jiang | H04M 3/548 455/428 |
| 8,554,825 | B2* | 10/2013 | Falchuk | H04L 12/66 709/200 |
| 9,148,769 | B2* | 9/2015 | Mahendran | H04L 29/12594 |
| 2005/0025182 | A1* | 2/2005 | Nazari | H04W 88/06 370/469 |
| 2005/0058125 | A1* | 3/2005 | Mutikainen | H04L 29/12292 370/354 |
| 2006/0116127 | A1* | 6/2006 | Wilhoite | H04M 3/42246 455/442 |
| 2007/0070948 | A1* | 3/2007 | Kezys | H04L 12/6418 370/331 |
| 2007/0109990 | A1 | 5/2007 | Bennett | |
| 2007/0109991 | A1 | 5/2007 | Bennett | |
| 2007/0109992 | A1 | 5/2007 | Bennett | |
| 2007/0110034 | A1 | 5/2007 | Bennett | |
| 2007/0110035 | A1 | 5/2007 | Bennett | |
| 2007/0110080 | A1 | 5/2007 | Bennett | |
| 2007/0110084 | A1 | 5/2007 | Bennett | |
| 2007/0110436 | A1 | 5/2007 | Bennett | |
| 2007/0110437 | A1 | 5/2007 | Bennett | |
| 2007/0121596 | A1* | 5/2007 | Kurapati | H04L 29/06027 370/356 |
| 2007/0183402 | A1 | 8/2007 | Bennett | |
| 2007/0183440 | A1 | 8/2007 | Bennet | |
| 2007/0238448 | A1* | 10/2007 | Gallagher | H04W 4/22 455/414.2 |
| 2007/0270145 | A1 | 11/2007 | Feng | |
| 2007/0297373 | A1* | 12/2007 | Saifullah | H04W 48/18 370/338 |
| 2008/0049623 | A1* | 2/2008 | Qiu | H04L 12/2697 370/241 |
| 2008/0076393 | A1* | 3/2008 | Khetawat | H04W 16/16 455/411 |
| 2009/0190573 | A1* | 7/2009 | Siegel | H04L 65/1016 370/352 |
| 2010/0014534 | A1 | 1/2010 | Bennett | |
| 2010/0130171 | A1* | 5/2010 | Palanigounder | H04L 63/0823 455/411 |
| 2010/0195641 | A1* | 8/2010 | Tsai | H04L 65/1073 370/352 |
| 2011/0069679 | A1 | 3/2011 | Onishi | |
| 2011/0110309 | A1 | 5/2011 | Bennett | |
| 2011/0249658 | A1* | 10/2011 | Wohlert | H04W 4/04 370/338 |
| 2012/0134486 | A1* | 5/2012 | Caipa | H04M 3/44 379/221.02 |
| 2012/0309375 | A1* | 12/2012 | Austin | H04W 4/001 455/418 |
| 2013/0137393 | A1* | 5/2013 | Sverdlov | H04M 15/8044 455/406 |
| 2013/0148630 | A1 | 6/2013 | Onishi et al. | |

FOREIGN PATENT DOCUMENTS

| | | |
|---|---|---|
| CN | 101083615 A | 12/2007 |
| CN | 101287276 A | 10/2008 |
| CN | 101543117 A | 9/2009 |
| DE | 102006057817 A1 | 6/2008 |
| EP | 2285080 A1 | 2/2011 |
| WO | 2004100452 A1 | 11/2004 |
| WO | 2011124760 A1 | 10/2011 |
| WO | 2011141621 A1 | 11/2011 |

OTHER PUBLICATIONS

English Translation of the Written Opinion of the International Search Authority in international application No. PCT/CN2013/081692, mailed on Nov. 21, 2013.
Supplementary European Search Report in European application No. 13844743.8, mailed on Oct. 28, 2015.
Combining CS calls and IMS sessions; Stage 3 (Release 7), mailed on Mar. 21, 2006.

* cited by examiner

METHOD, DEVICE AND SYSTEM FOR AUTOMATICALLY SWITCHING VOICE CALL SERVICES

TECHNICAL FIELD

The disclosure relates to the field of communication technologies, in particularly to a method, device and system for automatically switching voice call services.

BACKGROUND

Conventionally born by a Public Land Mobile Network (PLMN) which is unstable in network quality, voice calls are weak in signal and relatively poor in effect or even be dropped or off the network.

As mobile wireless networks develop and access modes become more diversified, wireless data services get more and more popular, users can enjoy, by means of mobile wireless networks, various data services, including web browsing, social applications, instant communication and the like. Voice calls over the Internet develop gradually with instant communication software.

At present, a scheme known for the selection of a voice call bearing domain and the switching among voice call bearing domains is as follows:

a condition for the switching to a preferred service bearer network is preset, the bearing quality of a service bearer network is monitored in real time, whether or not a bearer network switching condition is met is determined according to the bearing quality of the bearer network monitored when the first message of call signaling sent from a terminal is received by a media gateway, and a network having excellent bearing quality is selected to transmit voice call services, thereby improving the quality of the service. However, the scheme has the following problems:

first, in the scheme above, the device for switching bearer networks is a media gateway which makes a determination and a selection according to the quality of the current network and a preset switching condition without the participation of a mobile phone terminal, that is, the selection and switching process is transparent to the mobile phone terminal, thus, the user cannot select a desirable network for bearing a call as the user wishes; and secondarily, conventional signaling and messages of voice call are stilled used to continue the call after the bearer network is switched from a Public Switched Telephone Network (PSTN) to an Internet Protocol (IP) network, thus, the control mode of the voice service is unchanged.

Thus, how to combine a voice call based on the Internet with a conventional PLMN network voice call to make full use of a wireless data network for bearing the voice call and improving call quality and saving call fee has become a technical problem which needs to be solved urgently.

SUMMARY

A method, device and system for automatically switching voice call services are provided in embodiments of the disclosure, so as to solve the problem existing in the conventional technologies that the quality of a call cannot be improved and/or call fee cannot be saved as a PLMN network cannot be merged with IP network services well.

To solve the technical problem above, the technical solutions of the disclosure are as follows:

a method for automatically switching voice call services includes that:

when a calling terminal initiates a call aiming at a called terminal through a Public Land Mobile Network (PLMN), sending, by the calling terminal, an IP service query message containing identification information of the calling terminal and the called terminal to an Internet Protocol (IP) network service server;

querying, by the IP network service server, states of the calling terminal and the called terminal, and sending a switching selection prompt message to the calling terminal and the called terminal when the states of the calling terminal and the called terminal meet a preset call switching condition; establishing, by the IP network service server, an IP network connection path between the calling terminal and the called terminal when the calling terminal and the called terminal both select to switch the call, and notifying the calling terminal and the called terminal of establishing the IP network connection path;

after the notifying, breaking, by the calling terminal, a call connection with the PLMN network, and making an IP network call with the called terminal by using the IP network connection path.

In the method, the meeting the preset call switching condition may include: service authority states of the calling terminal and the called terminal are both of registered IP network call services, and data connection states of the calling terminal and the called terminal are both activated states.

In the method, the situation that the data connection states are the activated states may include: a cellular network is started and in the activated state, or a Wireless Local Area Network (WLAN) is started and in the activated state.

In the method, the method may further include:

when the calling terminal sends the IP service query message to the IP network service server, detecting, by the calling terminal, whether or not a current data connection state thereof is an activated state; and then sending, by the calling terminal, the IP service query message to the IP network service server when the current data connection state thereof is the activated state; and after the IP network service server receives the IP service query message, querying, by the IP network service server, a service authority state of the calling terminal and service authority and data connection states of the called terminal.

A terminal for automatically switching voice call services includes: a calling module, a switching selection module and an IP network call module, wherein the calling module is configured to send an IP service query message containing identification information of a calling terminal and a called terminal to an Internet Protocol (IP) network service server when initiating a call aiming at the called terminal through a Public Land Mobile Network (PLMN), and to break a call connection with the PLMN network based on the triggering of the IP network call module;

the switching selection module is configured to receive and display a switching selection prompt message sent from the IP network service server, and to send a selection result of a user to the IP network service server; and the IP network call module is configured to trigger the calling module after receiving a notification message of establishing an IP network connection path by the IP network service server for the calling terminal and the called terminal, and to make an IP network call between the calling terminal and the called terminal by using the IP network connection path.

In the terminal, the calling terminal may be further configured to detect whether or not a current data connection state thereof is an activated state when sending the IP service query message to the IP network service server, and to send the IP service query message to the IP network service server when the current data connection state thereof is the activated state.

An IP network service server includes:

an IP network service module, which is configured to query states of a calling terminal and a called terminal after receiving an IP service query message, and to send a switching selection prompt message to the calling terminal and the called terminal when the states of the calling terminal and the called terminal meet a preset call switching condition; and a path establishment module, which is configured to establish an Internet Protocol (IP) network connection path between the calling terminal and the called terminal when the calling terminal and the called terminal both select to switch a call, and to notify the calling terminal and the called terminal of establishing the IP network connection path.

In the server, the meeting the preset call switching condition in the IP network service module may include: service authority states of the calling terminal and the called terminal are both of registered IP network call services, and data connection states of the calling terminal and the called terminal are both activated states.

In the server, the situation that the data connection states are the activated states may include: a cellular network is started and in the activated state, or a Wireless Local Area Network (WLAN) is started and in the activated state.

A system for automatically switching voice call services includes: the foregoing terminal and the foregoing IP network service server.

The disclosure has the following beneficial effects:

the method, device and system for automatically switching voice call services disclosed herein are capable of intelligently determining the IP network service authority states and the data connection states of the current calling party and called party through the cooperation of a terminal and an IP network service server when a user initiates a voice call based on a PLMN network and automatically switching the voice call of the PLMN network to the voice call service of an IP network when the states of the calling party and the called party both meet a set switching condition. By bearing the current call with the IP network instead of the PLMN network, the method, the device and the system disclosed herein achieve the purposes of improving call quality and saving call fee.

DETAILED DESCRIPTION

The technical solutions involved in embodiments of the disclosure are described below clearly and completely with reference to the drawings, and apparently, the embodiments described herein are merely part of, but not all of embodiments of the disclosure.

To solve the problem existing in the conventional technologies that call quality cannot be improved and/or call fee cannot be saved because a PLMN network cannot be merged with IP network services well, a method, device and system for automatically switching voice call services are provided in embodiments of the disclosure. The embodiments of the disclosure realizes the switching from a PLMN network voice call service between a calling party and a called party to an Internet voice call when the calling party and the called party meet a preset condition, thus improving call quality and saving call fee.

To set forth the implementation process of the disclosure more clearly, the disclosure is described below in detail based on several specific embodiments.

Method Embodiment

Figure 1:
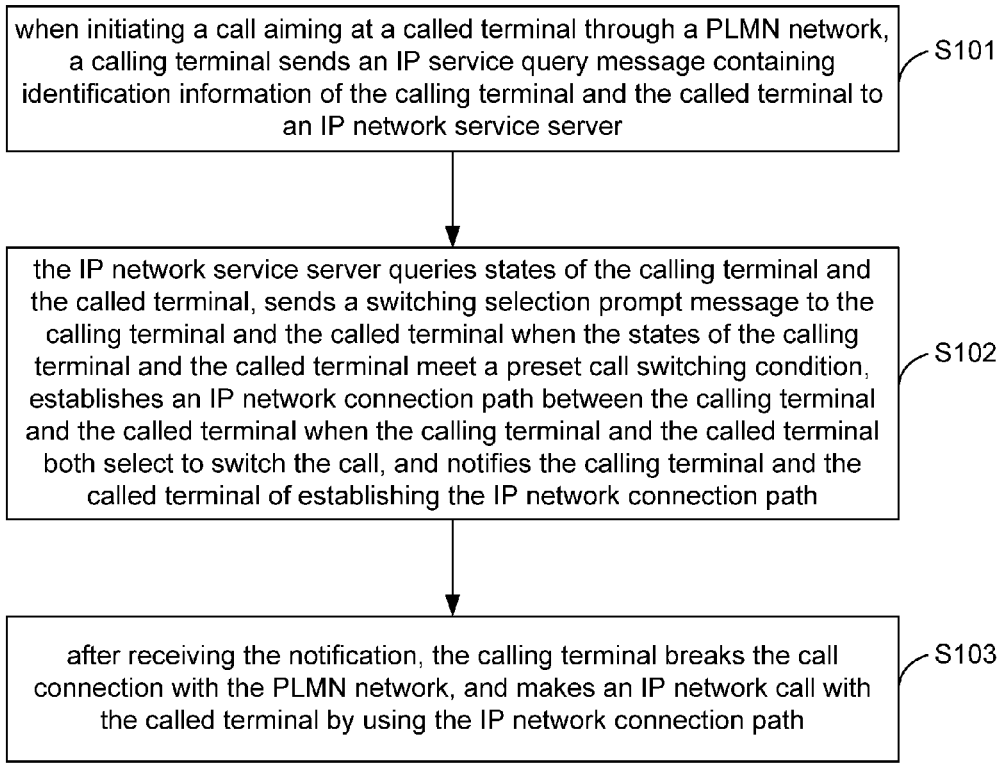
FIG. 1 is a flowchart illustrating a method for automatically switching voice call services provided in an embodiment of the disclosure.

As shown in FIG. 1, a method for automatically switching voice call services provided in an embodiment of the disclosure includes:

S101: when initiating a call aiming at a called terminal through a PLMN network, a calling terminal sends an IP service query message containing identification information of the calling terminal and the called terminal to an IP network service server;

Preferably, in this step, when sending the IP service query message to the IP network service server, the calling terminal further detects whether or not a current data connection state thereof is an activated state; if yes, it sends the IP service query message to the IP network service server.

S102: the IP network service server queries states of the calling terminal and the called terminal, sends a switching selection prompt message to the calling terminal and the called terminal when the states of the calling terminal and the called terminal meet a preset call switching condition, establishes an IP network connection path between the calling terminal and the called terminal when the calling terminal and the called terminal both select to switch the call, and notifies the calling terminal and the called terminal of establishing the IP network connection path.

Preferably, in this step, the meeting the preset call switching condition includes: service authority states of the calling terminal and the called terminal are both of registered IP network call services, and the data connection states of the calling terminal and the called terminal are both activated states.

The situation that the data connection states are the activated states includes: a cellular network is started and in the activated state, or a Wireless Local Area Network (WLAN) is started and in the activated state.

S103: after receiving the notification, the calling terminal breaks the call connection with the PLMN network, and makes an IP network call with the called terminal by using the IP network connection path.

To set forth the implementation process of the embodiment of the method disclosed herein, the method is described further based on a specific embodiment which specifically includes that when a calling user initiates a voice call on a mobile phone terminal, the mobile phone terminal first queries its own data connection state (including cellular network connection and WLAN connection), if the data connection state is an activated state, the mobile phone terminal sends a voice call signaling message to a PLMN network while sending an IP service query message to an IP network service server, wherein the IP service query message includes the telephone numbers of the calling party and the called party.

After receiving the IP service query message sent from the mobile phone terminal, the IP network service server analyzes the message to acquire the calling number and the called number, and checks the service authorities and the data connection states of the calling party and the called party; if the calling party and the called party both register an IP network call service and are both in a data connection activated state (including cellular network connection and WLAN connection), that is, the both parties meet a preset call switching condition, then the IP network service server separately sends a switching selection prompt message to the calling user and the called user to inquire of the both users about whether or not the both users are willing to switch the former PLMN voice call service to an IP network voice call service; if the both users select to switch the former PLMN voice call service to the IP network voice call service, then an IP network connection path is established between the both users, and the calling mobile phone terminal and the called phone terminal is notified of establishing the IP network connection path synchronously.

After receiving the notification, the calling terminal disconnects the former PLMN network voice call and starts an http protocol based network call, thereby switching the voice call service which should be born by the PLMN network to the IP network call.

In conclusion, the method provided in the embodiment is capable of intelligently determining the IP network service authority states and the data connection states of the current calling party and called party through the cooperation of a terminal and an IP network service server when a user initiates a voice call based on a PLMN network and automatically switching the voice call of the PLMN network to a voice call service of an IP network when the states of the calling party and the called party both meet a set switching condition. By bearing the current call with the IP network instead of the PLMN network, the method provided in the embodiment achieves the purposes of improving call quality and saving call fee.

Device Embodiment 1

Figure 2:
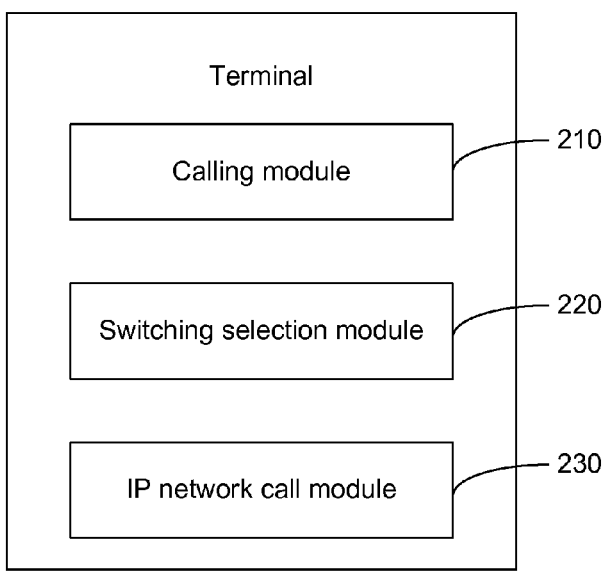
FIG. 2 is a block diagram illustrating the structure of a terminal for automatically switching voice call services provided in an embodiment of the disclosure.

As shown in FIG. 2, a terminal for automatically switching voice call services provided in an embodiment includes: a calling module 210, a switching selection module 220 and an IP network call module 230, wherein the calling module 210 is configured to send an IP service query message containing identification information of a calling terminal and a called terminal to an IP network service server when initiating a call aiming at the called terminal through a PLMN network, and to break a call connection with the PLMN network based on the triggering of the IP network call module 230;

the switching selection module 220 is configured to receive and display a switching selection prompt message sent from the IP network service server, and to send a selection result of a user to the IP network service server; and the IP network call module 230 is configured to trigger the calling module 210 after receiving a notification message of establishing an IP network connection path by the IP network service server for the calling terminal and the called terminal, and to make an IP network call between the calling terminal and the called terminal by using the IP network connection path.

Preferably, in the embodiment, the calling terminal 210 is further configured to detect whether or not the current data connection state thereof is an activated state when sending the IP service query message to the IP network service server; if yes, then to send the IP service query message to the IP network service server.

The situation that the data connection state is an activated state includes: a cellular network is started and in the activated state, or a Wireless Local Area Network (WLAN) is started and in the activated state.

Device Embodiment 2

Figure 3:
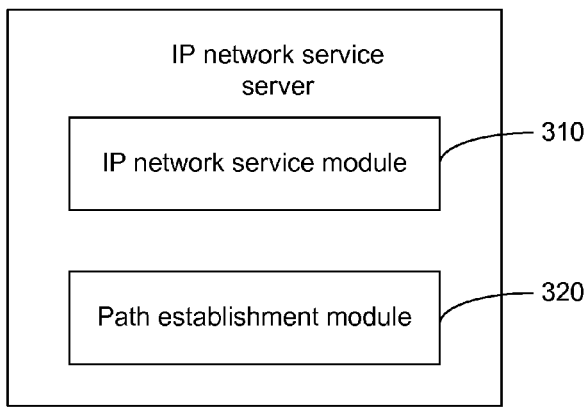
FIG. 3 is a block diagram illustrating the structure of an IP network service server provided in an embodiment of the disclosure.

As shown in FIG. 3, an IP network service server provided in an embodiment of the disclosure includes:

an IP network service module 310, which is configured to query states of a calling terminal and a called terminal after receiving an IP service query message, and to send a switching selection prompt message to the calling terminal and the called terminal when the states of the calling terminal and the called terminal meet a preset call switching condition; and a path establishment module 320, which is configured to establish an IP network connection path between the calling terminal and the called terminal when the calling terminal and the called terminal both select to switch a call, and to notify the calling terminal and the called terminal of establishing the IP network connection path.

Preferably, in the embodiment, in the IP network service module 310, the meeting the preset call switching condition includes: service authority states of the calling terminal and the called terminal are both of registered IP network call services, and data connection states of the calling terminal and the called terminal are both activated states.

The situation that the data connection states are activated states includes: a cellular network is started and in the activated state, or a Wireless Local Area Network (WLAN) is started and in the activated state.

In conclusion, the device provided in the embodiment is capable of intelligently determining the IP network service authority states and the data connection states of the current calling user and called user through the cooperation of a terminal and an IP network service server when a user initiates a voice call based on a PLMN network and automatically switching the voice call of the PLMN network to a voice call service of an IP network when the states of the calling party and the called party both meet a set switching condition. By bearing the current call with the IP network instead of the PLMN network device provided in the embodiment achieves the purposes of improving call quality and saving call fee.

System Embodiment

Figure 4:
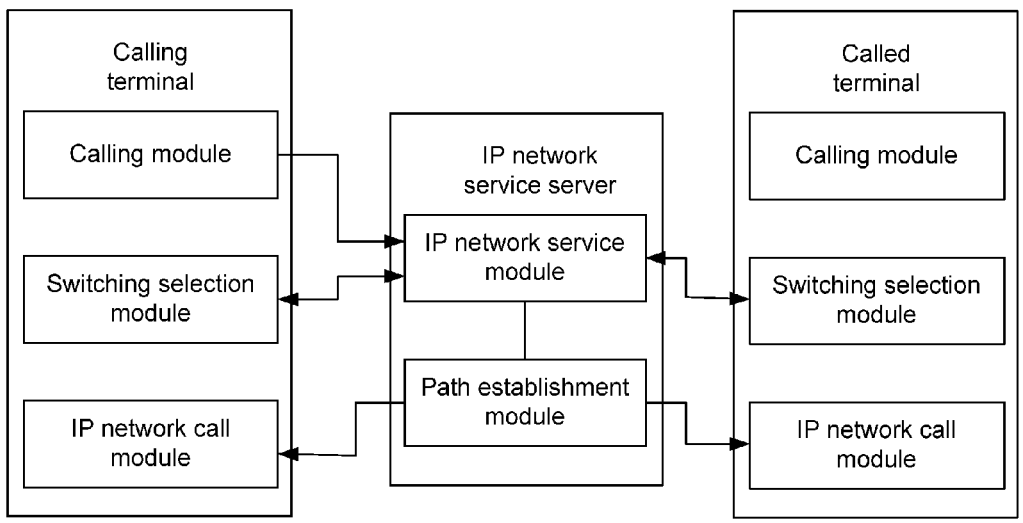
FIG. 4 is a block diagram illustrating the structure of a system for automatically switching voice call services provided in an embodiment of the disclosure.

As shown in FIG. 4, a system for automatically switching voice call services provided in the embodiment includes: the terminal described in device embodiment 1, and the IP network service server described in device embodiment 2; wherein the terminal includes a calling terminal and a called terminal. Specifically:

in the system of the embodiment, a calling module, a switching selection module and an IP network call module are arranged in the terminal in advance; and an IP network service module and a path establishment module are arranged in the IP network service server in advance.

When the terminal initiates a voice call based on a PLMN network, the calling module of the calling terminal receives a voice call initiation instruction of a user, the calling module preferably queries a data connection state (including cellular network connection and WLAN connection) of the calling terminal; if the data connection of the calling terminal is in an activated state, then apart from executing the conventional PLMN network call signaling, the calling module also sends an IP service query message to the IP network service module, wherein the telephone numbers of the calling user and the called user are included in the message;

after receiving the IP service query message, the IP network service module of the IP network service server queries service authority states and data connection states of the calling user and the called user according to the calling number and the called number included in the message; if the calling user and the called user both register an IP network call service and are both in a data connection activated state (including cellular network connection and WLAN connection), that is, the both parties meet a preset call switching condition, then the IP network service module separately sends a switching selection prompt message to the calling terminal and the called terminal to inquire of the both users about whether or not the users are willing to switch the former PLMN voice call service to an IP network voice call service.

The calling terminal and the called terminal receive and display, through the switching selection module, the switching selection prompt message sent from the IP network service server, and send selection results of the users to the IP network service server;

the IP network service module of the IP network service server establishes an IP network connection path between the calling party and the called party when the calling party and the called party both select to switch to the IP network voice call service and synchronously notifies the calling terminal and the called terminal of starting an IP network call module to make a call;

after the calling terminal and the called terminal receive a notification message from the IP network service serve through the IP network call module, the calling terminal disconnects the former PLMN network voice call through the calling module, and starts an http protocol based network call, thereby switching the voice call service which should be born by the PLMN network to the IP network call.

In the description above, the calling module may be a wireless transmitter, the switching selection module may be a switch or a combination of switches, the IP network call module may be a single chip microcomputer, the IP network service module may be a CPU for processing services, and the path establishment module may be a wireless module.

In conclusion, the system provided in the embodiment is capable of intelligently determining the IP network service authority states and the data connection states of the current calling party and called party through the cooperation of a terminal and an IP network service server when a user initiates a voice call based on a PLMN network and automatically switching the voice call of the PLMN network to a voice call service of an IP network when the states of the calling party and the called party both meet a set switching condition. By bearing the current call with the IP network instead of the PLMN network, the method, the device and the system disclosed herein achieve the purposes of improving call quality and saving call fee.

The mentioned above is only preferred embodiments of the disclosure but not to be construed as limiting the invention.

INDUSTRIAL APPLICATION

The method, device and system for automatically switching voice call services provided herein are capable of intelligently determining the IP network service authority states and the data connection states of the current calling party and called party through the cooperation of a terminal and an IP network service server when a user initiates a voice call based on a PLMN network and automatically switching the voice call of the PLMN network to a voice call service of an IP network when the states of the calling party and the called party both meet a set switching condition. By bearing the current call with the IP network instead of the PLMN network, thereby achieving the purposes of improving call quality and saving call fee.

The invention claimed is:

1. A method for automatically switching voice call services, comprising:
    Initiating, by a calling terminal, a call aiming at a called terminal through a Public Land Mobile Network (PLMN),
    sending, by the calling terminal, an IP service query message containing identification information of the calling terminal and the called terminal to an Internet Protocol (IP) network service server;
    querying, by the IP network service server, states of the calling terminal and the called terminal,
    sending, by the IP network service server, a switching selection prompt message to the calling terminal and the called terminal to inquire whether the calling terminal and the called terminal switch the call through the PLMN to a call through an IP network when the states of the calling terminal and the called terminal meet a preset call switching condition;
    establishing, by the IP network service server, an IP network connection path between the calling terminal and the called terminal when the calling terminal and the called terminal both select to switch the call through the PLMN to the call through the IP network,
    notifying, by the IP network service server, the calling terminal and the called terminal of establishing the IP network connection path;
    breaking, by the calling terminal, a call connection with the PLMN after the notifying, and
    making, by the calling terminal, the call through the IP network with the called terminal by using the IP network connection path.

2. The method according to claim 1, wherein the meeting the preset call switching condition comprises: service authority states of the calling terminal and the called terminal are both of registered IP network call services, and data connection states of the calling terminal and the called terminal are both activated states.

3. The method according to claim 2, wherein the situation that the data connection states are the activated states comprises: a cellular network is started and in the activated state, or a Wireless Local Area Network (WLAN) is started and in the activated state.

4. The method according to claim 3, further comprising:
    detecting, by the calling terminal, whether or not a current data connection state thereof is an activated state when the calling terminal sends the IP service query message to the IP network service server;
    sending, by the calling terminal, the IP service query message to the IP network service server when the current data connection state thereof is the activated state;

receiving, by the IP network service server, the IP service query message, and querying, by the IP network service server, a service authority state of the calling terminal and service authority and data connection states of the called terminal.

5. The method according to claim 1, further comprising:

detecting, by the calling terminal, whether or not a current data connection state thereof is an activated state when the calling terminal sends the IP service query message to the IP network service server;

sending, by the calling terminal, the IP service query message to the IP network service server when the current data connection state thereof is the activated state;

receiving, by the IP network service server, the IP service query message; and querying, by the IP network service server, a service authority state of the calling terminal and service authority and data connection states of the called terminal.

6. The method according to claim 2, further comprising:

detecting, by the calling terminal, whether or not a current data connection state thereof is an activated state when the calling terminal sends the IP service query message to the IP network service server;

sending, by the calling terminal, the IP service query message to the IP network service server when the current data connection state thereof is the activated state;

receiving, by the IP network service server, the IP service query message, and querying, by the IP network service server, a service authority state of the calling terminal and service authority and data connection states of the called terminal.

7. A terminal for automatically switching voice call services, comprising: a calling module, a switching selection module and an IP network call module, wherein the calling module is configured to send an IP service query message containing identification information of a calling terminal and a called terminal to an Internet Protocol (IP) network service server when initiating a call aiming at the called terminal through a Public Land Mobile Network (PLMN), and to break a call connection with the PLMN based on the triggering of the IP network call module;

the switching selection module is configured to receive and display a switching selection prompt message sent from the IP network service server to inquire whether the terminal switches the call through the PLMN to a call through an IP network, and to send a selection result of a user to the IP network service server; and the IP network call module is configured to trigger the calling module after receiving a notification message of establishing an IP network connection path by the IP network service server for the calling terminal and the called terminal, and to make the call through the IP network between the calling terminal and the called terminal by using the IP network connection path.

8. The terminal according to claim 7, wherein the calling terminal is further configured to detect whether or not a current data connection state thereof is an activated state when sending the IP service query message to the IP network service server, and to send the IP service query message to the IP network service server when the current data connection state thereof is the activated state.

9. An Internet Protocol (IP) network service server, comprising:

an IP network service module, which is configured to query states of a calling terminal and a called terminal after receiving an IP service query message, and to send a switching selection prompt message to the calling terminal and the called terminal to inquire whether the calling terminal and the called terminal switch a call through a Public Land Mobile Network (PLMN) to a call through an IP network when the states of the calling terminal and the called terminal meet a preset call switching condition; and a path establishment module, which is configured to establish an Internet Protocol (IP) network connection path between the calling terminal and the called terminal when the calling terminal and the called terminal both select to switch the call through the PLMN to the call through the IP network, and to notify the calling terminal and the called terminal of establishing the IP network connection path.

10. The IP network service server according to claim 9, wherein the meeting the preset call switching condition in the IP network service module comprises: service authority states of the calling terminal and the called terminal are both of registered IP network call services, and data connection states of the calling terminal and the called terminal are both activated states.

11. The IP network service server according to claim 10, wherein the situation that the data connection states are the activated states comprises: a cellular network is started and in the activated state, or a Wireless Local Area Network (WLAN) is started and in the activated state.

12. A system for automatically switching voice call services, comprising: a terminal and an Internet Protocol (IP) network service server, wherein, the terminal comprises: a calling module, a switching selection module and an IP network call module, wherein the calling module is configured to send an IP service query message containing identification information of a calling terminal and a called terminal to an Internet Protocol (IP) network service server when initiating a call aiming at the called terminal through a Public Land Mobile Network (PLMN), and to break a call connection with the PLMN based on the triggering of the IP network call module;

the switching selection module is configured to receive and display a switching selection prompt message sent from the IP network service server to inquire whether the terminal switches the call through the PLMN to a call through an IP network, and to send a selection result of a user to the IP network service server; and the IP network call module is configured to trigger the calling module after receiving a notification message of establishing an IP network connection path by the IP network service server for the calling terminal and the called terminal, and to make the call through the IP network between the calling terminal and the called terminal by using the IP network connection path;

the IP network service server comprises:

an IP network service module, which is configured to query states of a calling terminal and a called terminal after receiving an IP service query message, and to send a switching selection prompt message to the calling terminal and the called terminal to inquire whether the calling terminal and the called terminal switch a call through a PLMN to a call through an IP network when the states of the calling terminal and the called terminal meet a preset call switching condition; and a path establishment module, which is configured to establish an Internet Protocol (IP) network connection path between the calling terminal and the called terminal when the calling terminal and the called terminal both select to switch the call through the PLMN to the call through the IP network, and to notify the calling terminal and the called terminal of establishing the IP network connection path.

13. The system according to claim 12, wherein the meeting the preset call switching condition in the IP network service module comprises: service authority states of the calling terminal and the called terminal are both of registered IP network call services, and data connection states of the calling terminal and the called terminal are both activated states.

14. The system according to claim 13, wherein the situation that the data connection states are the activated states comprises: a cellular network is started and in the activated state, or a Wireless Local Area Network (WLAN) is started and in the activated state.

15. The system according to claim 14, wherein the calling terminal is further configured to detect whether or not a current data connection state thereof is an activated state when sending the IP service query message to the IP network service server, and to send the IP service query message to the IP network service server when the current data connection state thereof is the activated state.

16. The system according to claim 12, wherein the calling terminal is further configured to detect whether or not a current data connection state thereof is an activated state when sending the IP service query message to the IP network service server, and to send the IP service query message to the IP network service server when the current data connection state thereof is the activated state.

17. The system according to claim 13, wherein the calling terminal is further configured to detect whether or not a current data connection state thereof is an activated state when sending the IP service query message to the IP network service server, and to send the IP service query message to the IP network service server when the current data connection state thereof is the activated state.

* * * * *